(12) United States Patent
Farnam et al.

(10) Patent No.: US 6,345,926 B1
(45) Date of Patent: Feb. 12, 2002

(54) SPHERICAL MOUNTING ARRANGEMENT

(75) Inventors: Randy G. Farnam, Pekin; Kenneth J. Hoefling, Kickapoo; William H. Zimmerman, Edelstein, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/641,070

(22) Filed: Aug. 17, 2000

(51) Int. Cl.$^7$ .............................. E02F 3/76; F16C 25/04
(52) U.S. Cl. .................... 403/76; 172/811; 403/141; 403/143
(58) Field of Search ................... 172/810, 811, 172/825; 403/21, 76, 77, 141, 143

(56) References Cited

U.S. PATENT DOCUMENTS

| | | | |
|---|---|---|---|
| 945,110 A | 1/1910 | Smith | |
| 2,808,666 A | 10/1957 | Schneckloth | |
| 2,875,535 A | 3/1959 | Williams et al. | |
| 2,942,363 A | 6/1960 | Long | |
| 3,016,635 A | * 1/1962 | Aston | 172/810 X |
| 3,525,448 A | * 8/1970 | Bauer | 403/76 X |
| 3,922,040 A | 11/1975 | Carter | |
| 3,941,195 A | 3/1976 | Stedman | |
| 3,964,803 A | 6/1976 | Eftefield et al. | |
| 3,974,882 A | 8/1976 | Eftefield | |
| 4,031,967 A | * 6/1977 | Atherton et al. | 403/143 X |
| 4,217,063 A | 8/1980 | Fischer et al. | |
| 4,286,674 A | 9/1981 | Noble et al. | |
| 4,639,160 A | * 1/1987 | Huesman | 403/76 X |

* cited by examiner

Primary Examiner—Lynne H. Browne
Assistant Examiner—John R. Cottingham
(74) Attorney, Agent, or Firm—Calvin E. Glastetter

(57) ABSTRACT

Spherical mountings are useful for pivotally connecting a push arm of a blade to a track roller frame of a machine. When the blade is removed the bearing assembly must be disassembled and to reconnect the blade to the spherical mounting the bearing assembly needed to shimmed to obtain the correct gap or clearance between the bearing and the spherical mounting. The subject mounting arrangement includes a mounting assembly having a first end portion removeably connected to the push arm of a blade and a second end portion positioned around a spherical assembly and being removeably connected to a bearing assembly of the spherical assembly. This arrangement of components provides for removing the push arm of the blade from the mounting on the track roller frame without removing the bearing assembly.

12 Claims, 4 Drawing Sheets

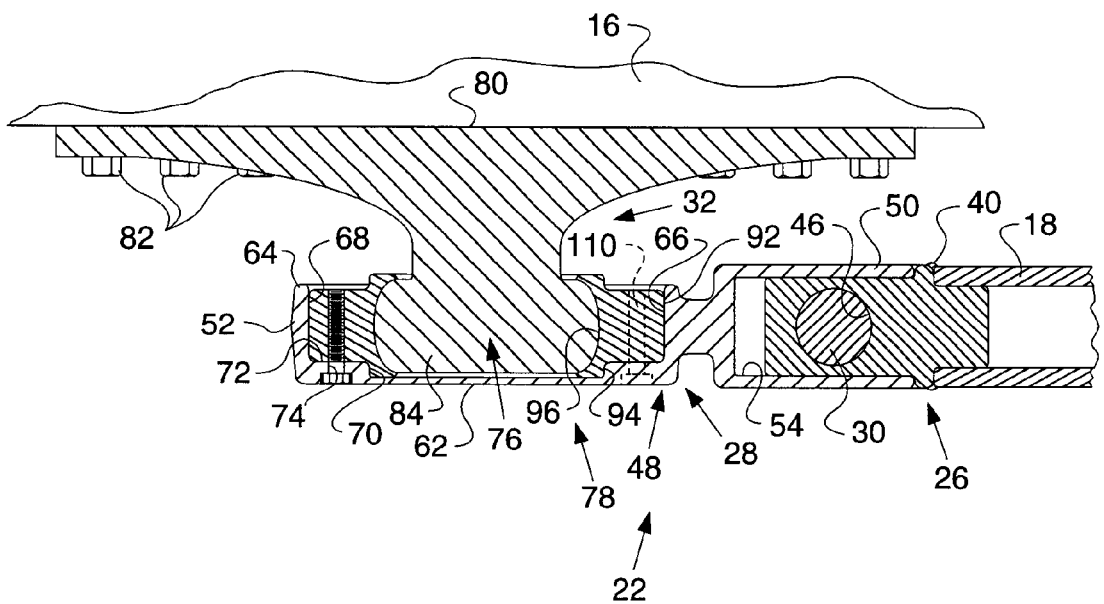

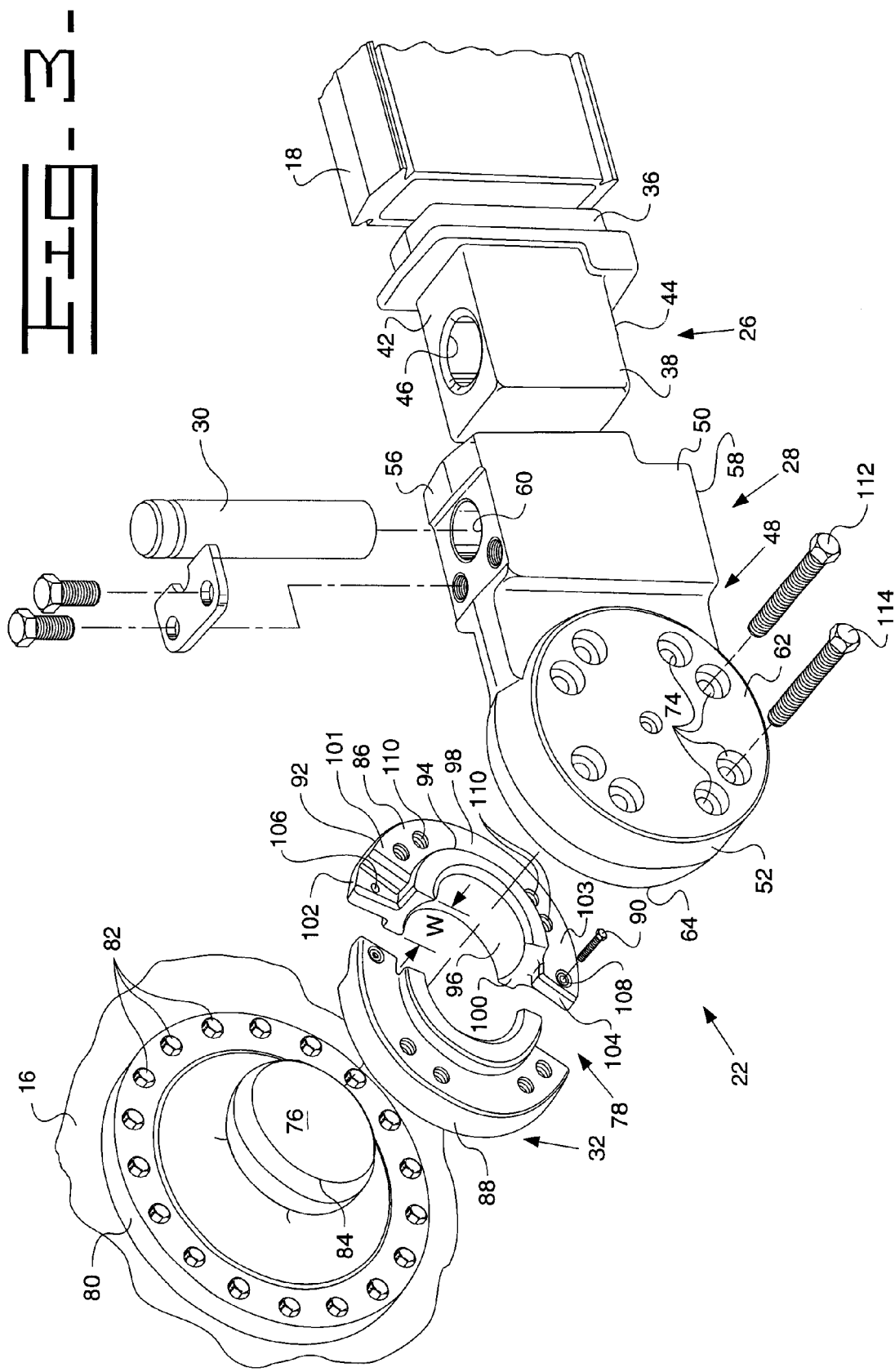

Fig_4
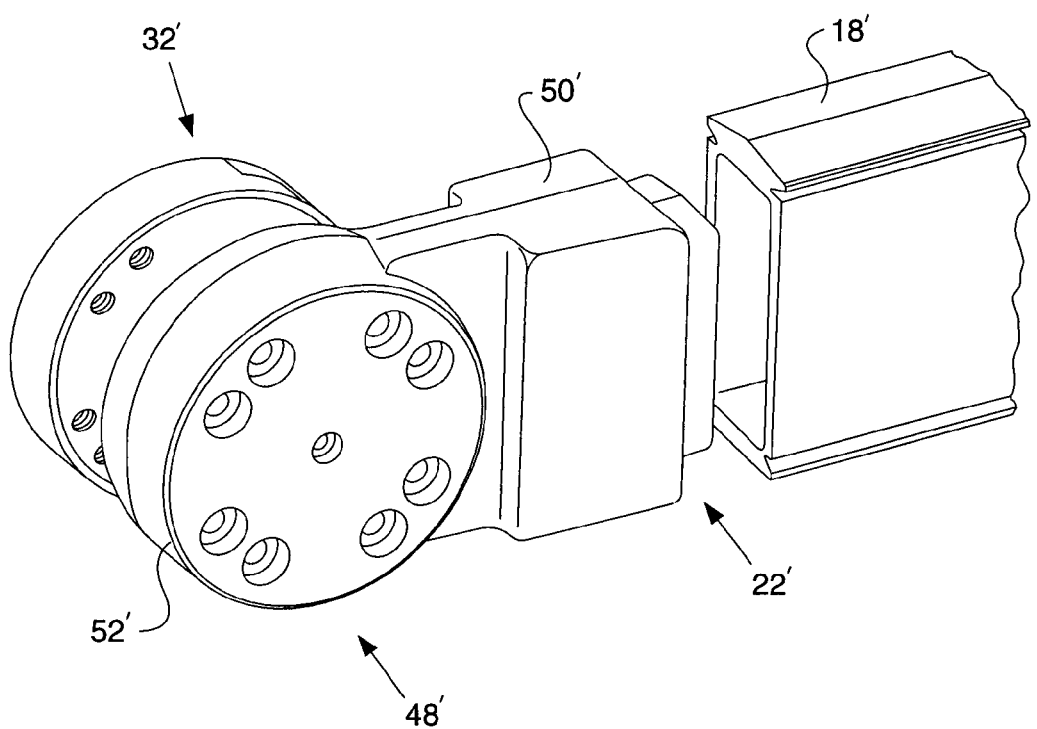

1

SPHERICAL MOUNTING ARRANGEMENT

TECHNICAL FIELD

This invention relates to an arrangement and method for mounting a push arm of a bulldozer blade to a track roller frame and more particularly to an arrangement having replaceable bearing components and a mounting removable from the push arm.

BACKGROUND ART

Spherical mounting arrangements are commonly used to connect a push arm of a blade to a track roller frame of a machine. U.S. Pat. No. 4,286,674, assigned to the assignee of this application discloses a replaceable bearing assembly for mounting the push arm of the blade to the track roller frame of a machine. This shows a connector welded to the push arm and a pair of bearing caps around a ball stud and the bearing caps being attached to the connected by bolts. The bolts and bearing caps must be removed to disconnect the push arm from the ball stud. When it the push arm is reconnected the ball stud the bearing caps needed to be shimmed or adjusted to get the correct gap or spacing between the bearing caps and the ball stud.

The present invention is directed to overcoming one or more of the problems as set forth above.

DISCLOSURE OF THE INVENTION

In one aspect of the present invention an arrangement for mounting a push arm of a bulldozer blade to a track roller frame of a machine is provided. The mounting arrangement includes a connector being attached to an end of the push arm. A spherical assembly is attached to the track roller frame and extends outwardly away from the track roller frame. A mounting assembly is positionable around the spherical member and has a cavity for receiving the connector and an aperture being aligned with the aperture in the connector. A pin is positionable within the apertures to releaseably connect the mounting assembly to the connected attached to the push arm.

Another aspect of the present invention provides a method for adjusting a bearing assembly relative to a housing and a spherical member. The method comprising the steps of positioning the bearing assembly having first and second bearing members around the spherical member. Securing the members together around the spherical member. Positioning the bearing assembly and the spherical member within a cavity of the housing. Positioning one of the bearing members until it contacts the housing. Tightening a first plurality of fasteners to secure the one bearing member to the housing. Positioning the other bearing member in the opposite direction until it contacts the housing. Tightening a second plurality of fasteners to secure the other bearing member to the housing to control the spacing between the spherical member and the bearing members.

The present invention provides an arrangement for the push arm of the blade to the track roller frame of the machine. The arrangement includes a spherical assembly attached to the track roller frame and a mounting assembly attached to the spherical assembly. A connector attached to the push arm is removeable connected to the mounting assembly. The push arm can be disconnected from the machine without removing the mounting assembly and the bearing assembly.

BRIEF DESCRIPTION OF THE DRAWINGS

FIG. 2 is a sectional view taken along line 2—2 of FIG. 1 illustrating the present invention;

FIG. 3 is an exploded view showing the present invention; and

FIG. 4 is an alternate embodiment of the connection between the push arm spherical assembly.

BEST MODE FOR CARRYING OUT THE INVENTION

Figure 1:
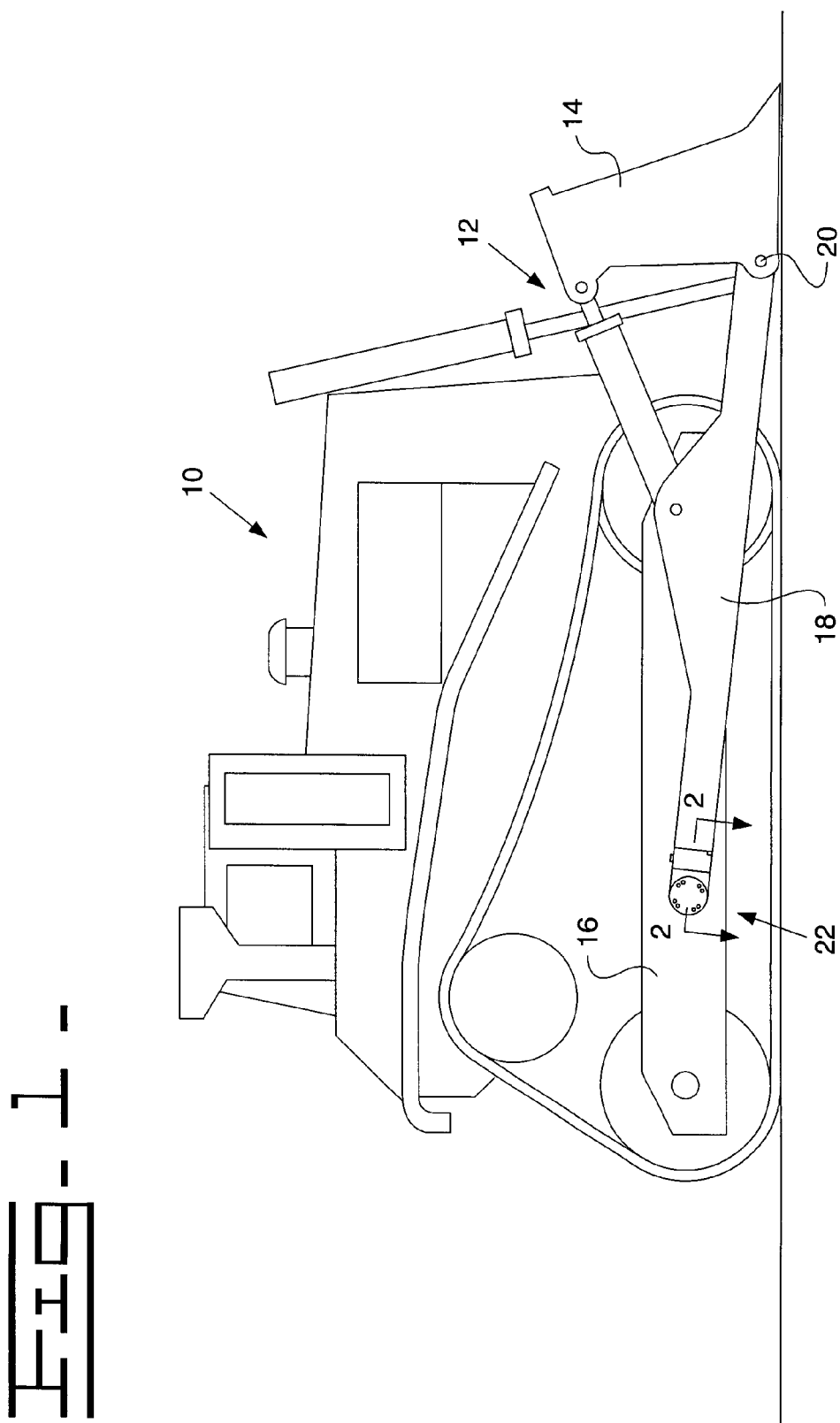
FIG. 1 is a diagrammatic side view of a track type tractor having a push arm of a bulldozer blade removably mounted to the track roller frame by the present invention.

Referring to FIG. 1, a machine, such as a track-type tractor 10 is illustrated has having a bulldozer assembly 12 mounted forwardly thereon. The bulldozer assembly 12 includes a generally upright blade 14 connected to a pair of laterally spaced track roller frames 16 (one shown) of the tractor 10 by a pair of laterally spaced push arms 18 (one shown). The forward end of the push arm 18 is pivotally connected to the blade 14 at a pivot connection 20. A rearward end of the push arm 18 is pivotally connected to a respective track roller frame 16 by a connecting arrangement 22, embodying the present invention.

As best shown in FIGS. 2 and 3 the mounting arrangement 22 includes a connector member 26 attached to the push arm 18, a mounting assembly 28 removeably connected to the connector member 26 by a pin 30, and a spherical assembly 32 connecting the mounting assembly 28 to the track roller frame 16.

The connector member 26 includes a first end portion 36 and a second end portion 38. The first end portion 36 being attached, such as by a weld 40, to the rearward end of the push arm 18. The second end portion 38 extends rearwardly from the push arm 18 and includes an upper surface 42 and a lower surface 44. A vertical aperture 46 extends from the upper surface 42 to the lower surface 44.

The mounting assembly 28 includes a housing 48 having a first end potion 50 and a second end portion 52. The first end portion 50 has a cavity 54 defined therein. The cavity 54 is sized for receiving the second end portion 38 of the connector member 26. The first end portion 50 has a top portion 56 and a bottom portion 58 and an aperture 60 extends through the top and bottom portions 56, 58. When the first end portion 50 is positioned around the second end portion 38 of the connector 26 the apertures 46, 60 are aligned. The pin 30 is inserted into the apertures 46, 60 for connecting the housing 48 to the connector 26. The housing 48 includes a first side 62 and a second side 64 and a stepped cavity 66 formed in the second side 64. The stepped cavity 66 has a first diameter cavity portion 68 and a second diameter cavity portion 70, the second diameter cavity being smaller than the first diameter cavity, and an annular shoulder 72 therebetween. A plurality of apertures 74 extend from the first side 62 of the housing 48 to the annular shoulder 72.

The spherical assembly 32 includes a spherical member 76 and a bearing assembly 78. The spherical member 76 has a first end portion 80 which is removably attached to the track roller frame 16 by a plurality of fasteners, such as bolts 82, and a second end portion 84 extending away from the track roller frame 16. The bearing assembly 78 is formed by a first semi-circular bearing member 86, a second semi-circular bearing member 88 and a pair of fasteners, such as bolts 90. The first and second bearing members 86, 88 are identical, therefore only bearing member 86 will be described in detail. The bearing member 86 has a first outer peripheral surface 92 sized to be positioned within the first cavity 68, a second outer peripheral surface 94 sized to be positioned within the second cavity 70 and a semispherical bearing surface 96 defined therein. The bearing member 86 has an outer vertical surface 98 and an inner vertical surface 100 and defines a predetermined width "W" of the bearing member 86. The bearing member 86 has a first end portion 101 which includes a first tab 102 and a second end portion 103 which includes a second tap 104. The first tab 102 extends, approximately half the width of "w", from the outer vertical surface 98 toward the inner vertical surface 100 and includes an aperture 106 therethrough. The second tab 104 extends, approximately half the width of "w", from the inner vertical surface 100 toward the outer vertical surface 98 and includes a threaded aperture 108 therethrough. The bearing member 86 includes a plurality of threaded apertures 110 extending between the inner and outer vertical surfaces 98, 100. With the bearing assembly 78 positioned around the spherical member 76 the first tab 102 of one bearing member 86, 88 will overlap the second tab 104 in the other bearing member 86, 88 and the apertures 106,108 will be aligned. The bolts 90 pass through the aperture 106 in the first tab 102 and are threadably engaged with the threaded aperture 108 in the second tab 104 to maintain the bearing members 86,88 in position around the spherical member 76.

A first plurality of fasteners, such as bolts 112, are inserted in the apertures 74 of the housing 47 and are threadably engaged with the threaded apertures 110 in the first bearing member 86. A second plurality of fasteners, such as bolts 114, are inserted in the apertures 74 of the housing 47 and are threadably engaged with the threaded apertures 110 in the second bearing member 88 to control spacing between the bearing members 86, 88, the housing 48 and the spherical member 76.

Referring to FIG. 4, components that are similar to previously described will be shown by like reference numerals including a prime. "'". A connecting arrangement 22' includes a housing 48' having a first end portion 50' and a second end portion 52'. The first end portion 50' is positioned for direct attachment to the rearward end portion of the push arm 18'. The second end potion 52' is removeably attached to the spherical assembly 32'.

Industrial Applicability

In the use of the mounting arrangement 22 the push arm 18 of the blade 14 is pivotally mounted on the track roller frame 16 of the machine 10. The spherical member 76 is mounted to the track roller frame 16 by the plurality of fasteners 80 and extends outwardly. The first and second semi-circular bearing members 86,88 are positioned around the spherical member 76 and the ends of the bearing members are loosely maintained in position by the fasteners 90. The bearing assembly 78 and the spherical member 76 are then positioned with in the cavity 66 of the housing 48. The housing 48 or one of the bearing members 86, 88 is positioned to contact the inner surface of the housing to align the threaded apertures in the bearing member with the apertures in the housing. A first plurality of fasteners is inserted into some of the apertures in the housing and tightened into the threaded apertures to connect the housing to one of the bearing members. Then the housing or the other bearing member is positioned to contact the inner surface of the housing to align the threaded apertures in the bearing member with the apertures in the housing. A second plurality of fasteners is inserted into the remaining apertures in the housing and are tightened into the threaded apertures to connect the housing to the other bearing member. This procedure will adjust the spacing between the bearing members, the spherical member and the housing. With the mounting assembly 28 connected to the spherical assembly 32 the connector member 26 is positioned within the cavity 54 of the housing 48 to align the apertures 46, 60. Then the pin 30 is inserted in the apertures 46, 60 to removeably connect the push arm 18 to the track roller frame 16.

In view of the forgoing, it is readily apparent that the structure of the present invention provides a mounting structure to removeably connect the push arm of the blade to the track roller. The blade can be removed from the machine without changing the adjustment or spacing between the spherical member, the bearing assembly and the housing.

Other aspects and advantages of this invention can be obtained from a study of the drawings, the disclosure and the appended claims.

What is claimed is:

1. An arrangement for mounting a push arm of a bulldozer blade to a track roller frame of a machine, the mounting arrangement, comprising:

a connector being attached to an end of the push arm, the connector having an aperture therethrough;

a spherical assembly being removably connected to the track roller frame;

a mounting assembly being positionable around the spherical assembly and being adapted to resist lateral movement while allowing the mounting assembly to rotate around the spherical assembly, the mounting assembly having a cavity for receiving the connector and an aperture being aligned with the aperture in the connector; and a pin positionable within the aperture in the mounting assembly and the aperture in the connector to releaseably connect the mounting assembly to the connector attached to the push arm.

2. The mounting arrangement of claim 1, wherein the spherical assembly includes a spherical member and a bearing assembly having identical first and second semi-circular bearing members being positional around the spherical member.

3. The mounting arrangement of claim 2, wherein each of the semi-circular bearing members has a first end portion having a first tab and a second end portion having a second tab.

4. The mounting arrangement of claim 3, wherein the first tab includes an aperture and the second tab includes a threaded aperture, the aperture of one bearing member being aligned with the threaded aperture of the other bearing when positioned around the spherical member.

5. The mounting arrangement of claim 4, wherein the bearing member includes a plurality of threaded apertures extending axially relative to the spherical member.

6. The mounting arrangement of claim 5, wherein the mounting assembly includes a housing having a first end portion with the cavity for receiving the connector and a second end portion with a cavity for receiving the spherical assembly.

7. The mounting arrangement of claim 6, wherein the first end potion of the housing includes a plurality of apertures extending axially in respect to the spherical member, the apertures being aligned with the threaded apertures in the bearing member.

8. The mounting arrangement of claims 7, including a plurality of fasteners positional within the apertures in the second end portion of the housing and being threadably engaged with the threaded apertures in the bearing members.

9. An arrangement adapted for mounting a push arm of a bulldozer blade to a track roller frame of a machine, the mounting arrangement comprising:

a spherical member attached to the track roller frame and extending therefrom outwardly away from the track roller frame;

a pair of semicircular bearing members positional around the spherical member, the bearing members having a first side surface adjacent the track roller frame, a second side surface being spaced outwardly of the first side surface, a plurality of threaded apertures extend from the first side surface to the second side surface, each of the bearing members having a first reduced thickness tab having a aperture therethrough and a second reduced thickness tab having a threaded aperture therethrough, the tabs overlap with the apertures in the tabs being aligned;

a fastener extending through the aperture in the first tab of one bearing member and being threadably tightened into the threaded aperture in the second tab of the other bearing member;

a mounting assembly connectable to the push arm and being positionable over the bearing members and the spherical member, the mounting assembly having a cavity sized to receive the bearings and the spherical member, the mounting assembly having a inner surface adjacent the bearing within the cavity and a outer surface, a plurality of apertures extend from the inner surface to the outer surface; and a plurality of fasteners extending through the apertures in the mounting assembly and being threadably tightened into the threaded apertures in the bearing member.

10. The mounting arrangement of claim 9, including a connector being attached to an end of the push arm, the connector having an aperture therethrough.

11. The mounting arrangement of claim 10, wherein the mounting assembly includes a housing having a first end portion removeably attached to the connector and a second end portion removeably attached to the bearing members.

12. The mounting arrangement of claim 9, wherein the mounting assembly is directly attached to the push arm.

* * * * *